April 22, 1924.

R. R. OWEN 1,491,492

TRANSMISSION MECHANISM

Original Filed March 16, 1916   2 Sheets-Sheet 1

Inventor
Ralph R. Owen
By his Attorneys

April 22, 1924.
R. R. OWEN
1,491,492
TRANSMISSION MECHANISM
Original Filed March 16, 1916   2 Sheets-Sheet 2
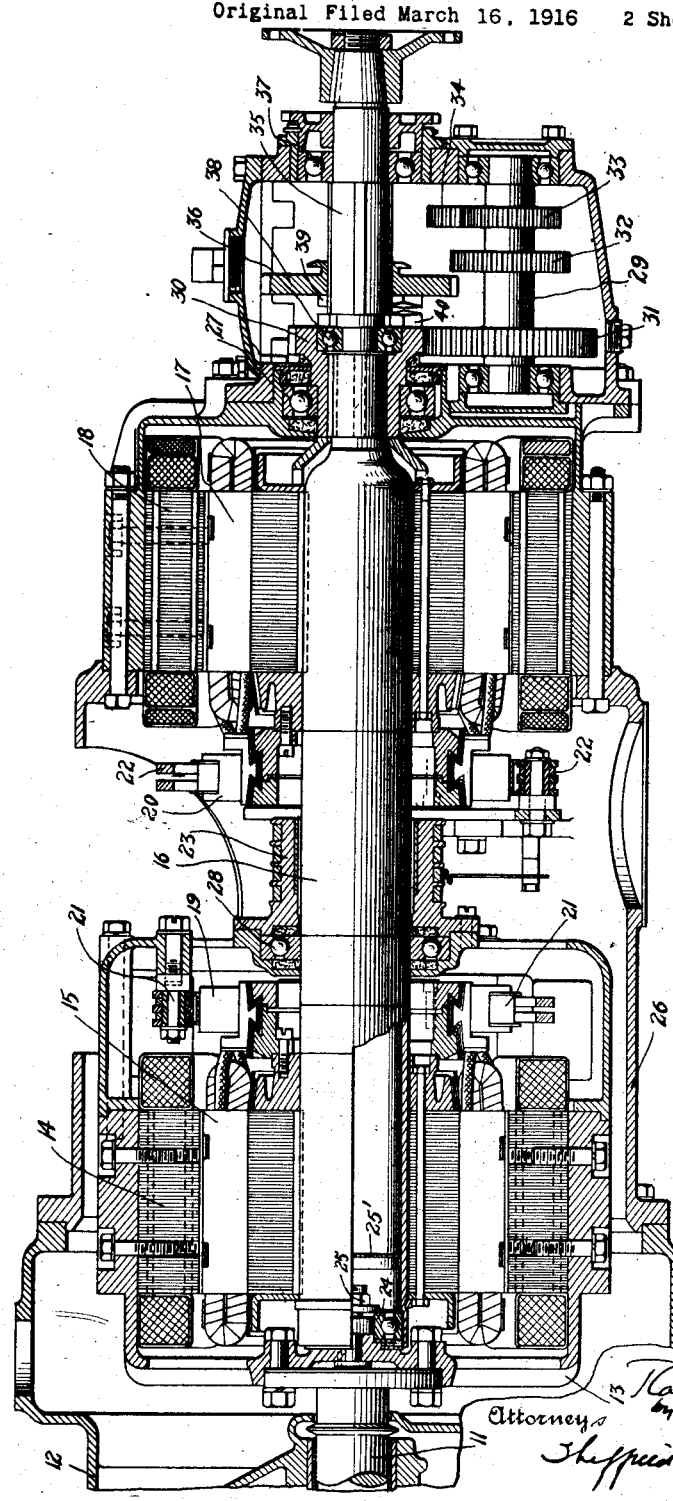

Patented Apr. 22, 1924.

1,491,492

UNITED STATES PATENT OFFICE.

RALPH R. OWEN, OF NEW YORK, N. Y., ASSIGNOR TO ENTZ MOTOR PATENTS CORPORATION, A CORPORATION OF NEW YORK.

TRANSMISSION MECHANISM.

Application filed March 16, 1916, Serial No. 84,566. Renewed August 30, 1923.

*To all whom it may concern:*

Be it known that I, RALPH R. OWEN, a citizen of the United States, and a resident of the borough of Manhattan, city, county, and State of New York, have invented certain new and useful Improvements in Transmission Mechanisms, of which the following is a description.

This invention relates to transmission mechanisms, and may be used to advantage in connection with electrical transmission mechanisms of the general type described in the patents of Justus B. Entz, No. 732,062, issued June 30, 1903, and No. 1,164,588, issued December 14, 1915, and in the application of the said Justus B. Entz, Serial No. 1906, filed January 13, 1915.

My invention has particular reference to features of mechanical construction involved in transmissions of the type referred to.

Such transmission mechanisms are adapted particularly for transmitting power from a prime mover, such as an internal combustion engine, to the driving mechanism of a self-propelled vehicle, and include a dynamo electric machine having rotatable field and armature elements, one of which is carried by the shaft of the prime mover, and the other of which is carried by the driving shaft of the vehicle. With such a construction, it is of the utmost importance that the shaft of the prime mover and the driving shaft of the vehicle and the electrical elements carried by said shafts be maintained in alignment at all times, and it is an object of my invention to provide means including suitably arranged bearings for accomplishing this result.

Transmission mechanisms such as are above referred to may include also a second dynamo electric machine, one element of which is stationary, and the other of which is carried by the driving shaft of the vehicle. Another object of my invention is, therefore, the provision of a suitable support for the stationary element, and of additional bearings for maintaining the proper relation between the elements of the second dynamo electric machine.

With these and other objects in view, as will more fully hereinafter appear, my invention includes the provision of a vehicle driving shaft, which is hollow substantially throughout its length, whereby I obtain a high degree of stiffness and rigidity with comparatively small weight. With such a construction, I provide also a convenient and efficient method of maintaining the proper alignment between the shaft of the prime mover and the vehicle drive shaft.

I preferably employ also a housing which forms a continuation of the casing of the prime mover shaft, and serves not only to protect the dynamo electric machine or machines from the elements, but also as a support for one or more of the bearings of the hollow drive shaft. Other features of my invention will be described in the specification and pointed out in the claims which follow.

In the drawings,

Fig. 2 is a longitudinal sectional view of such transmission mechanism; and

Figure 1:
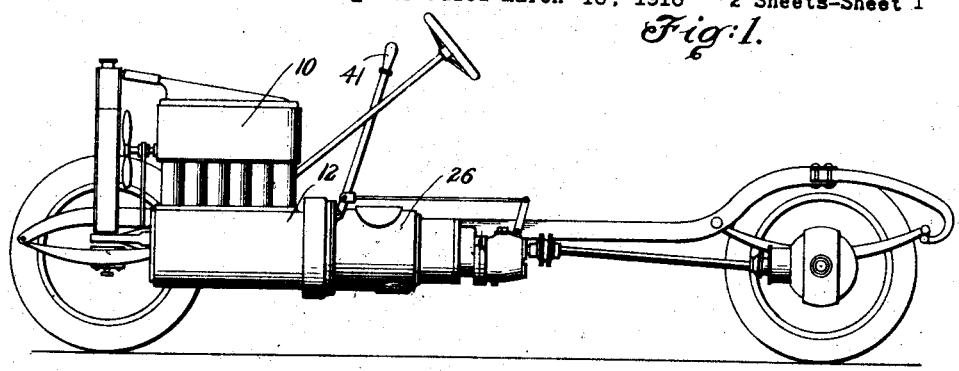
Fig. 1 is a more or less diagrammatic view of an automobile chassis, equipped with an electrical transmission mechanism embodying my invention.

As shown in the drawings, the prime mover 10, which may be an internal combustion engine, is provided with a shaft 11 and with a casing 12 for said shaft. Secured to the rear end of the shaft 11 is a spider or other suitable member 13 to which the field element 14 of a dynamo electric machine is secured. The spider has a hub or projection disposed preferably centrally thereof. The armature element 15 of this dynamo electric machine is carried by the shaft 16 in alignment with the shaft 11. This shaft 16 may carry also an armature 17 of a second dynamo electric machine, the field element 18 of which is stationary. Each of the dynamo electric machines is illustrated as being provided with a commutator 19, 20 with which the brushes 21, 22, respectively, cooperate. The collector rings 23 are located between the two dynamo electric machines, and are adapted to be engaged by brushes not shown, said rings being connected electrically to the coils of the field 14 and to the brushes 21.

The above is a general description of the Entz transmission as described in the aforesaid Letters Patent and application, and will not be described in detail herein, since it forms no part of my invention, but is merely intended to illustrate one of the forms of transmission mechanism with which my invention may be employed.

An important feature of my invention, however, resides in making the shaft 16 hollow, whereby a high degree of stiffness is obtained, while at the same time the weight of the shaft is reduced to a minimum. The employment of this hollow shaft also makes possible a most efficient and convenient method of aligning said shaft with the shaft 11 of the prime mover.

Figure 3:
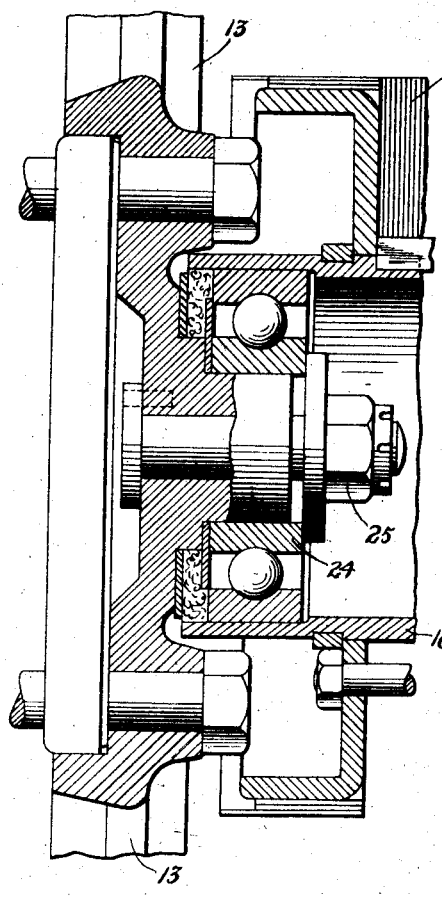
Figs. 3 and 4 are sectional views on an enlarged scale of details of construction.
Figure 4:
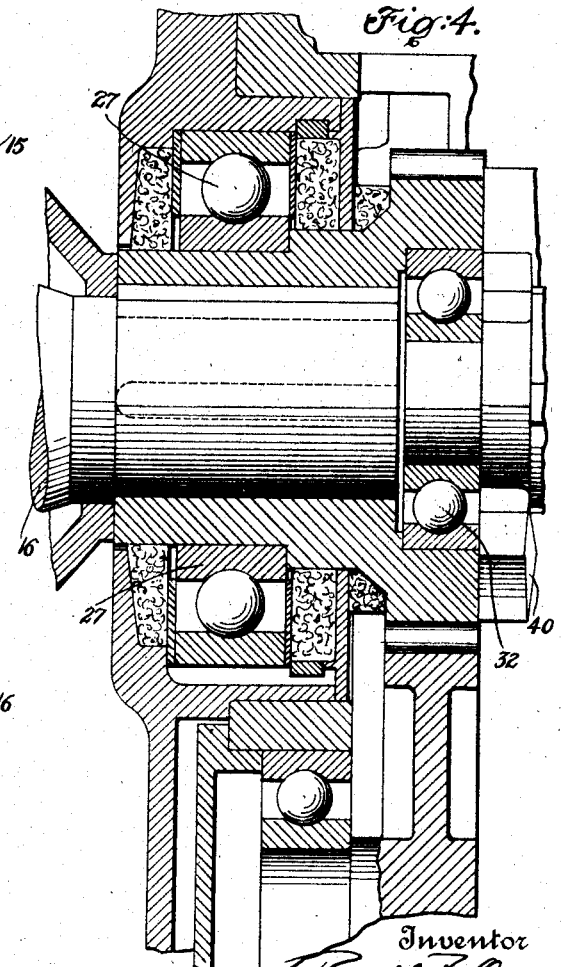

Thus, referring particularly to Fig. 3, I provide a ball-and-ring bearing 24 within the forward end of the hollow shaft 16 and supported from the rear end of the prime mover shaft 11 in any suitable manner, as by the nut 25 on the hub or projection of the spider, which thus projects but a slight distance into the hollow shaft. The forward end of the shaft 16 is thus maintained at all times in perfect alignment with the shaft 11.

As shown in Fig. 2, I may insert a disk, as illustrated at 25', so that a cup is formed at the forward end of the shaft 16, which may, if desired, be packed with grease for lubricating purposes.

Secured to the casing 12 of the prime mover and extending rearwardly therefrom is a housing 26, which serves not only as a cover for the electrical elements, but also serves as a support for the field element 18 of the rear machine and for suitable bearings for the rear end of the shaft 16. These bearings may also be of the ball-and-ring type, as illustrated at 27, and since they are supported from the housing 26, which in turn is secured to the casing 12 of the prime mover shaft, they effectually maintain the rear end of the shaft 16 in proper position, so that, by means of the bearings 24 and 27 the entire shaft 16 is maintained in alignment with the shaft 11.

While the means above referred to are sufficient for maintaining the proper relation between the elements 17 and 18 of the rear dynamo electric machine, one of which elements is secured to the housing 26, I find it preferable to employ an additional bearing 28, supported at the rear end of the field element 14, for cooperation with the shaft 16 at a point intermediate its length. Thus, since the forward end of the field element 14 is aligned with the shaft 16 through the medium of bearing 24, and since the rear end of this field element is aligned with the shaft 16 through the medium of bearing 28, the alignment between the rotary field element 14 and its armature 15 which is carried by shaft 16, is at all times accurately maintained.

I have illustrated the drive shaft 16 as geared at its rear end to a countershaft 29 through the gears 30, 31. This countershaft preferably carries a reduction gear 32 and a gear 33 meshing with an idler 34. The shaft 35 which is maintained in alignment with the shaft 16 by suitable bearings 36, 37, is provided with a slidable gear 38, having upon its forward face teeth 39 which are adapted to cooperate with similar teeth 40 carried at the rear of shaft 16 for effecting a direct drive of the vehicle by shafts 16 and 35. This gear 38 is also adapted to be moved in any suitable manner, as by the lever 41, into mesh with the gear 32 on the countershaft, or into mesh with the idler 34, whereby the vehicle may be driven forwardly at a reduced speed, or rearwardly, as is well understood by those skilled in the art. This arrangement of gears, however, forms no part of my invention.

From the above description of my improved arrangement of the various members constituting the transmission mechanism, it is apparent that I have provided a most compact, efficient and durable construction, and have at the same time reduced the weight and the number of parts to a minimum. The advantages of such construction should be obvious to those skilled in the art, but it is desired to point out particularly the fact that after the parts have been assembled in proper alignment, this alignment will be maintained at all times without the necessity of any adjustment. This feature is of particular importance in transmissions which employ electric machines, since in such cases, in order to obtain efficient results, it is necessary that the proper mechanical relation be maintained between the elements of the electric machines.

As suggested above, I have herein described my invention as used in connection with the Entz two-unit transmission system, merely as an illustration of one of the many possible embodiments thereof. And it is to be understood that it may be used to equal advantage with any other type of electrical transmission involving aligned shafts.

What I claim is:—

1. In a propelling mechanism, the combination with a prime mover having a driving shaft and a casing therefor, of a housing secured to and extending rearwardly from said casing, and means enclosed within said housing for transmitting power from the driving shaft to a load, including a hollow shaft aligned with said driving shaft, a dynamo electric machine located at the rear of the prime mover, one element of said machine being connected to the driving shaft and the other to the hollow shaft, a second dynamo electric machine, one element of said second machine being supported by said housing and the other connected to the hollow shaft, a bearing for the rear end of said hollow shaft supported by said housing, a bearing for the rear end of the driving shaft and the forward end of the hollow shaft located within the forward end of the hollow shaft, and a bearing supported by the rear end of the first mentioned element of the first dynamo electric machine and cooperating with said hollow shaft at a point intermediate its length, substantially as described.

2. In a propelling mechanism, the combination with a prime mover having a driving shaft, of a dynamo electric machine located at the rear of the prime mover and having one element provided with a spider adapted to be connected to the driving shaft and having a projection thereon, a hollow shaft supporting the other member of the dynamo electric machine and a bearing secured to said projection and cooperating with and projecting slightly into the forward end of said hollow shaft.

3. In a propelling mechanism, the combination with a prime mover having a driving shaft terminating at its rear end in a flange, of a dynamo electric machine located at the rear of the prime mover, one element of said machine being provided with a spider having a hub thereon, the central portion of the spider being adapted to be connected to said flange on the driving shaft, a hollow shaft supporting the other member of the dynamo electric machine, and a bearing secured to the hub of said spider and cooperating with and projecting slightly into the forward end of the hollow shaft.

4. In a propelling mechanism, the combination with a prime mover having a driving shaft terminating at its rear end in a flange, of a dynamo electric machine located at the rear of the prime mover, one element of said machine being provided with a spider, the hub of which is adapted to be connected to said flange on the driving shaft and is provided with a central aperture, a hollow shaft upon which the other element of said dynamo electric machine is supported, an annular ball-bearing, one of the members of which is carried at the interior of the hollow shaft, and a pin passing through the aperture in the spider and adapted to secure another member of the bearing in position upon the hub of the spider.

In testimony whereof I have signed this specification in the presence of two subscribing witnesses.

RALPH R. OWEN.

Witnesses:
UVAN R. WINTALL,
ROBERT W. HANLEY.